US012346728B2

(12) United States Patent
Abdelkhalek et al.

(10) Patent No.: US 12,346,728 B2
(45) Date of Patent: Jul. 1, 2025

(54) JOB LIMIT ENFORCEMENT FOR IMPROVED MULTITENANT QUALITY OF SERVICE

(71) Applicant: ATI TECHNOLOGIES ULC, Markham (CA)

(72) Inventors: Ahmed M. Abdelkhalek, Ajax (CA); Rutao Zhang, Markham (CA); Bokun Zhang, Markham (CA); Min Zhang, King City (CA); Yinan Jiang, Richmond Hill (CA); Jeffrey G. Cheng, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 133 days.

(21) Appl. No.: 18/072,818

(22) Filed: Dec. 1, 2022

(65) Prior Publication Data
US 2024/0184623 A1   Jun. 6, 2024

(51) Int. Cl.
*G06F 9/54* (2006.01)
*G06F 9/48* (2006.01)
*G06F 9/50* (2006.01)

(52) U.S. Cl.
CPC .............. *G06F 9/4881* (2013.01); *G06F 9/54* (2013.01)

(58) Field of Classification Search
CPC ................................ G06F 9/4881; G06F 9/54
See application file for complete search history.

(56) References Cited

U.S. PATENT DOCUMENTS

| | | | |
|---|---|---|---|
| 10,102,165 B2 * | 10/2018 | Check | G06F 1/24 |
| 2012/0229481 A1 * | 9/2012 | McCrary | G06F 9/5044 345/522 |
| 2015/0178135 A1 * | 6/2015 | Wang | H04L 45/021 718/104 |
| 2018/0113731 A1 * | 4/2018 | Cheng | G06F 9/45558 |
| 2019/0287205 A1 * | 9/2019 | Ramadoss | G06F 9/4881 |
| 2019/0317802 A1 * | 10/2019 | Bachmutsky | G06F 9/5044 |
| 2020/0334064 A1 * | 10/2020 | Jiang | G06F 13/4282 |
| 2020/0409732 A1 | 12/2020 | Kovacevic | |
| 2021/0019085 A1 | 1/2021 | Zhu et al. | |
| 2021/0272229 A1 * | 9/2021 | McCrary | G06F 9/5027 |
| 2021/0279247 A1 * | 9/2021 | Kumar | G06F 9/5072 |
| 2022/0058048 A1 | 2/2022 | Jiang et al. | |

(Continued)

OTHER PUBLICATIONS

U.S. Appl. No. 18/085,902, filed Dec. 21, 2022, Entitled "Multi-Level Scheduling for Improved Quality of Service" listing Ahmed M. Abdelkhalek as inventor, 33 pages.

(Continued)

Primary Examiner — Shawn Doman

(57) ABSTRACT

Systems and methods are provided related to a scheduler to receive a job request from a virtual function associated with a tenant for execution by at least one processing unit. The scheduler validates the job request in accordance with one or more defined restrictions associated with the tenant and, responsive to successful validation, provides the job request for execution by the processing unit via one or more physical functions associated with the processing unit. In certain embodiments, multi-level enforcement of the defined restrictions are provided via user-mode and kernel-mode drivers associated with the virtual function that are also enabled to validate job requests based on the defined restrictions.

16 Claims, 4 Drawing Sheets

(56) References Cited

U.S. PATENT DOCUMENTS

2023/0008176 A1\* 1/2023 Sedaghat .............. G06F 9/5038
2023/0297526 A1\* 9/2023 Puffer ................. G06F 13/1668
710/267

OTHER PUBLICATIONS

U.S. Appl. No. 18/088,955, filed Dec. 27, 2022, listing Yuping Shen et al. as inventors, entitled "Job Submission Alignment With World Switch", 28 pages.
U.S. Appl. No. 18/088,962, filed Dec. 27, 2022, listing Yuping Shen et al. as inventors, entitled "Budget-Based Time Slice Assignment for Multiple Virtual Functions", 27 pages.
International Search Report and Written Opinion issued in Application No. PCT/US2023/085176, mailed Apr. 24, 2024, 8 pages.

\* cited by examiner

| | Tenant | VF_ID | Engine | Restriction |
|---|---|---|---|---|
| 250-1 | A | VF0 | ENGINE_0 | DecodeMaxRes = 4K |
| 250-2 | A | VF0 | ENGINE_0 | EncodeMaxRes = 1080P |
| 250-3 | B | VF1 | ANY | DecodeMaxRes = 4K |
| 250-4 | B | VF1 | ANY | EncodeMaxRes = 1080P |
| 250-5 | C | VF2 | ENGINE_1 | DecodeMaxRes = NONE |
| 250-6 | C | VF2 | ENGINE_1 | EncodeMaxRes = 1080P |
| 250-7 | C | VF3 | ENGINE_0 | DecodeMaxRes = NONE |
| 250-8 | C | VF3 | ENGINE_1 | EncodeMaxRes = 1080P |

FIG. 2

JOB LIMIT ENFORCEMENT FOR IMPROVED MULTITENANT QUALITY OF SERVICE

BACKGROUND

Multitenant distributed computing systems have proven advantageous with respect to resource sharing and scalability. A multitenant solution is one used by multiple tenants, each of which may request access for multiple users (such as may be associated with a single organization, company, or group). Examples of multitenant applications include business-to-business (B2B) solutions such as accounting, work tracking, and other software as a service (SaaS) products; business-to-consumer (B2C) solutions such as video or music streaming, photo sharing, gaming, and social network services; and enterprise-wide platform solutions utilized by multiple business units within an organization. However, such systems are prone to detrimental performance and failure to meet quality of service (QOS) requirements if individual tenants are allowed to exceed resource limitations, as resources may then be unavailable for other tenants.

Certain hardware computing resources support virtualization that allows multiple virtual machines (VMs) to use the hardware computing resources, such as a graphics processing unit (GPU). Some VMs implement an operating system that allows the VM to emulate a physical machine. Other VMs are designed to execute code in a platform-independent environment. A virtual machine manager (VMM) or hypervisor creates and runs tenant VMs, which are also referred to as guest VMs or guests. A single physical function is used to support one or more virtual functions (VFs) that each enable an associated VM to access and utilize hardware capabilities of a virtualized computing resource. The physical function allocates the virtual functions to different VMs on the physical machine.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 2 illustrates a tabular depiction of a set of defined restrictions 200 in accordance with some embodiments.

DETAILED DESCRIPTION

Figure 1:
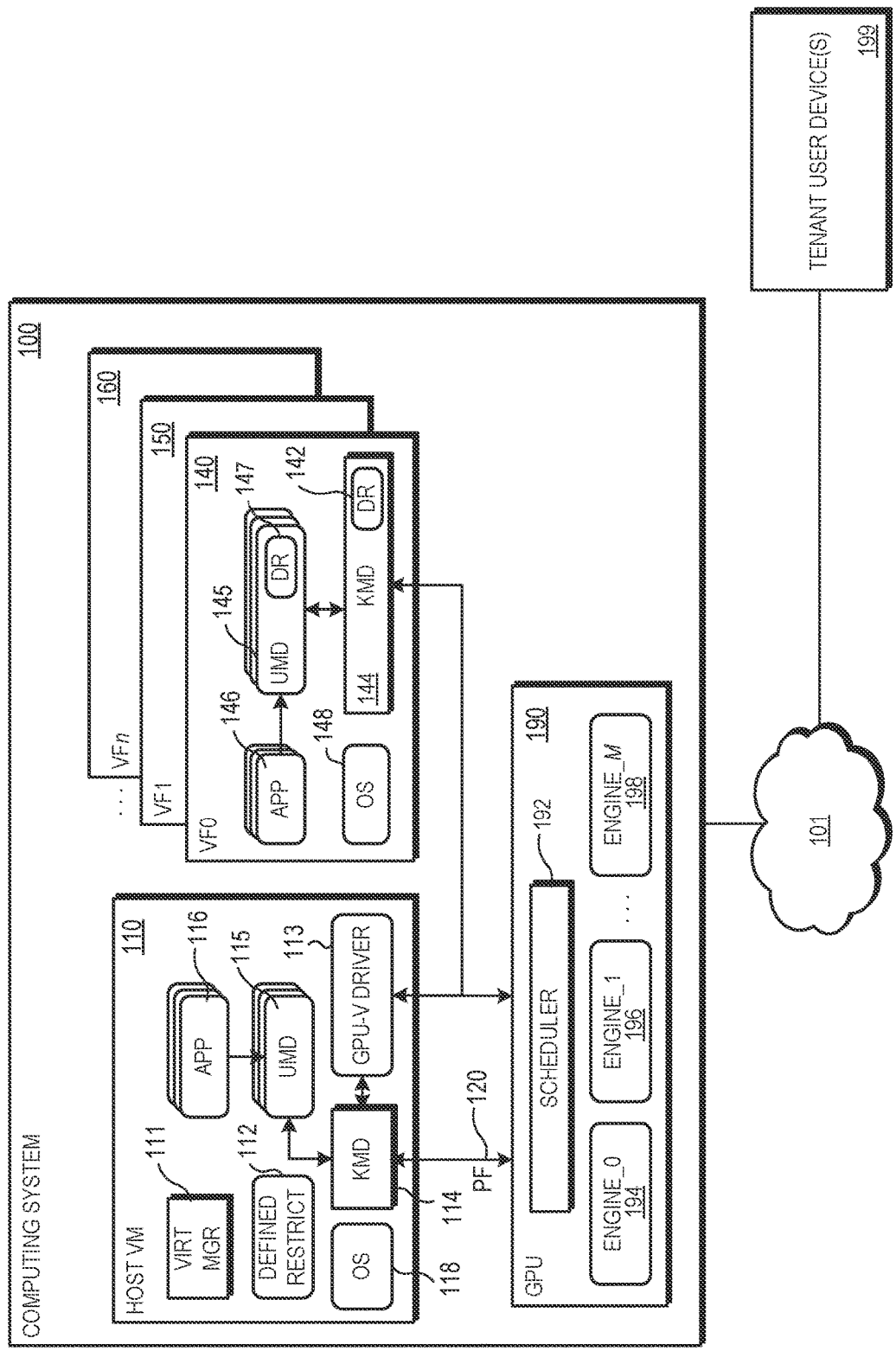
FIG. 1 illustrates a multitenant virtualized server configuration in accordance with some embodiments.

In certain multitenant computing environments, various computing resources such as central processing units (CPUs) and/or graphics processing units (GPUs) are partitioned across virtual functions (VFs), which issue job requests to the CPU to prepare and submit jobs for execution on behalf of the VFs. Each VF prepares job submissions, based on remote user input or otherwise, associated with a tenant on whose behalf the virtual function is executing. In various embodiments and scenarios, submitted job requests may be categorized in accordance with a job type associated with streaming and/or otherwise rendering video content.

The single root I/O virtualization (SR-IOV) interface is an extension to the Peripheral Component Interconnect Express (PCI Express or PCIe) serial computer expansion bus specification that allows a device, such as a network adapter or display adapter, to provision differentiated access to its resources among various PCIe hardware functions. These functions include both physical functions (PFs), which directly comprise primary functions of the hardware device and which typically require system- or supervisory-level permissions to access; and virtual functions (VFs), which are associated with the hardware device's PF but which utilize a virtualized version of one or more physical resources of the device (e.g., memory, display adapter, network port, etc.). It will be appreciated that although examples discussed herein are consistent with the SR-IOV interface, various embodiments may be implemented in contexts other than SR-IOV that support similar types of differentiated access for physical functions and virtual functions.

In some scenarios a tenant VF may act or attempt to act in a greedy or malicious manner by submitting an excessive number of jobs (or jobs that otherwise require a relatively high quantity of computing resources to execute), thereby causing potential QoS issues for other tenants sharing computing resources of the multitenant computing system. In such instances, the virtual function consumes a disproportionate share of those computing resources, which negatively impacts QoS for other executing VFs. The potential impact on other executing VFs is based on both throughput and latency. Throughput refers to the job execution rate, which in some cases relates to one or more of an encoding resolution and frame rate, a video decoding rate, or a rendering rate for desktop or game frames experienced by each virtual function. Latency refers to the time between submission of a job to the GPU until the job completes execution at the GPU such that the job results may be consumed within an expected latency. For example, in the context of video encoding, latency refers to the time a job takes to complete so an encoded frame can be streamed.

Embodiments described herein provide configuration and multi-level enforcement of defined tenant-, engine-, and job type-specific restrictions on tenant job submissions (e.g., job submissions for execution by a GPU) in a multitenant environment. In certain embodiments, the defined restrictions are enforced by one or more of a host-side virtualization-enabled GPU (GPU-V) driver, a kernel-mode driver (KMD) of a virtual function associated with a tenant, one or more user-mode drivers (UMDs) that are each associated with an application executing on behalf of that tenant, and/or a scheduling circuit (scheduler) associated with one or more rendering engines of the GPU. Such defined restrictions are of particular relevance to malicious or misbehaving tenants who employ open-source or modified driver code to exceed specified usage limits and potentially cause QoS issues to other tenants. For each tenant, engine, or job type, defined restrictions are configured in accordance with desired settings based on tenant-specific subscription plans and/or QoS targets. In this manner, embodiments described herein allow configuration of specific restrictions for each tenant in a multitenant environment (e.g., as may be configured by a server or service administrator) that are enforced on the tenant's host side (providing graceful detection and failure) as well as by a device-side driver (such as in case a misbehaving or malicious tenant bypasses the host-side enforcement).

FIG. 1 illustrates a multitenant virtualized server configuration in accordance with some embodiments. In particular, in the depicted embodiment a multitenant computing system 100 is executing a host VM 110 along with a plurality of virtual functions (VFs) 140, 150, 160, each of which is associated with a tenant (not shown) of the multitenant computing system 100. In certain embodiments, one or more of the VFs 140, 150, 160 are executed by a virtual machine (not shown) operating on behalf of the respectively associated tenant. In the depicted embodiment, the computing system 100 is communicatively coupled via one or more computer networks 101 to one or more tenant user devices 199. The tenant user devices 199 may include various client devices utilized by users associated with a tenant of the computing system 100 to interact with the computing system 100 to access one or more shared computing resources.

In the depicted embodiment, the host VM 110 includes a virtualization manager 111 that performs various management functions with respect to the VFs 140, 150, 160, and is also executing GPU-V driver 113 to manage job requests received via host-side UMDs 115 for execution by a GPU 190, to which the GPU-V driver 113 is communicatively coupled via physical function (PF) 120. The host VM 110 stores a set of defined restrictions 112 that are each associated with one of virtual functions 140, 150, 160, each of which is further associated with a tenant of the multitenant computing system 100. In certain embodiments, various defined restrictions may also be configured and associated with respect to the host VM 110, such as if the host VM is sharing one or more resources with one or more of the VFs 140, 150, 160.

In certain embodiments, the defined restrictions 112 are configured via the GPU-V driver, which subsequently handles event reporting or failure for jobs submitted in violation of that tenant's defined restrictions. The GPU-V driver 113 also propagates relevant defined restrictions (those associated with the relevant tenant) to KMD 144, which stores the relevant defined restrictions 142 for use in validating job requests of VF 140, and to one or more of UMDs 145, which stores the relevant defined restrictions 147 for use in validating job requests of its respectively associated tenant application 146.

In scenarios in which a tenant (or a UMD/KMD associated with that tenant and/or executing on their behalf) attempts to bypass validation, the relevant defined restrictions are nonetheless enforced on the device side by scheduling circuit (scheduler) 192 with minimal impact to other tenants, or on valid utilization of system resources by the same tenant.

It will be appreciated that while various examples discussed herein refer to operations of a GPU-V driver 113 utilizing physical functions and virtual functions to invoke hardware capabilities of GPU 190, in various embodiments the techniques described herein include other virtualization-enabled device drivers configured to invoke hardware capabilities of other processing units and/or devices in a manner similar to that described with respect to GPU-V driver 113 and GPU 190.

In operation, each job request is received by host KMD 114 from one of host applications 116 executed by the host VM 110, or from one of tenant applications 146 via a UMD 145 associated with that tenant application. It will be appreciated that in various embodiments, VFs 140, 150, 160 may represent any quantity n+1 of tenant VFs (e.g., VFs 0, 1, . . . , n). Moreover, although specific operations are described herein with respect to VF 140 and its various associated elements, in various embodiments and scenarios similar operations are performed by each of the VFs 150, 160 and their respectively associated elements as well. Although not shown for purposes of clarity, it will further be appreciated that in various scenarios and embodiments, each of multiple virtual functions executing on the computing system 100 (including VFs 150 and 160) may include component elements substantially similar to those described with respect to VF 140.

The host VM 110 generally operates as a privileged system management partition of the computing system 100. In certain embodiments, the primary responsibility of the host VM 110 is to manage the computing system 100, including to act as a hypervisor (via virtualization manager 111) over any executing tenant VMs (e.g., initiating instantiation, suspension, and/or destruction of tenant VMs, tenant VM workload scheduling, and the like). Additionally, in some embodiments the host VM 110 is responsible via virtualization manager 111 for various operations with respect to the abstraction and virtualization of hardware resources associated with the computing system 100, such as one or more virtualized display devices (not shown).

Each of the host VM 110 and the VF 140 is executing a respective operating system (OS) 118, 148. In various embodiments, each OS 118, 148 may be substantially identical or may be distinct.

In the depicted embodiment, the GPU 190 includes a scheduler 192 that assigns and schedules jobs for execution via one or more of a plurality of rendering engines 194, 196, 198. It will be appreciated that in various embodiments, rendering engines 194, 196, 198 may represent any quantity m+1 of rendering engines (e.g., ENGINE_0, ENGINE_1, . . . , ENGINE_m). Similarly, although a single scheduler 192 is depicted for clarity, in various embodiments additional schedulers may be utilized. For example, in certain embodiments a plurality of schedulers may manage a plurality of m+1 rendering engines, either in a one-to-one, one-to-many, or many-to-one basis. Although not shown for ease of illustration, in various embodiments the GPU 190 includes one or more additional components including, as non-limiting examples: a communication cross bar to provide cross-communication for components of the GPU 190; functional blocks (e.g., fixed function blocks, compute blocks, direct memory access (DMA) control blocks, etc.), a video interface, such as to communicatively couple a virtualized physical display to the computing system 100; etc.

FIG. 2 illustrates a tabular depiction of a set of defined restrictions 200 in accordance with some embodiments. In at least one embodiment, the set of defined restrictions 200 is substantially similar to the defined restrictions 112 of FIG. 1.

In the depicted embodiment, the set of defined restrictions includes a set of eight limitation entries 250-1 through 250-8, with each limitation entry including an indication of a tenant 210, a virtual function identifier 220, a rendering engine 230, and a restriction indicator 240. The set of defined restrictions 200 includes restrictions associated with three tenants (respectively identified as tenants A, B, C), four virtual functions (respectively identified as VF0, VF1, VF2, VF3), and two job types (encoding and decoding). In the depicted embodiment, the job type is implicative, such that the restriction indicator provides both a maximum value for a parameter and an inferable job type based on that parameter.

With respect to tenant A, limitation entries 250-1 and 250-2 each provide that job requests received from the tenant's associated virtual function VF0 are only allowed to be processed by an enumerated rendering engine ENGINE_0 (e.g., rendering engine 194 of FIG. 1). Moreover, the limitation entries 250-1 and 250-2 respectively provide that decoding jobs from tenant A are limited to a maximum resolution of 3840×2160 (commonly termed 4K resolution), while encoding jobs from tenant A are limited to a maximum resolution of 1920×1080 (commonly termed 1080p resolution).

With respect to tenant B, limitation entries 250-3 and 250-4 each provide that job requests received from the tenant's associated virtual function VF1 are allowed to be processed by any rendering engine of the GPU (e.g., any of rendering engines 194, 196, 198 of FIG. 1). In a manner similar to that described with respect to tenant A and limitation entries 250-1 and 250-2, limitation entries 250-3 and 250-4 further respectively provide that decoding jobs from tenant B are limited to a maximum of 4K resolution, with encoding jobs from tenant B limited to a maximum of 1080p resolution.

Continuing the example embodiment of FIG. 2, limitation entries 250-5 through 250-8 indicate that tenant C is associated with two virtual functions, VF2 and VF3. In accordance with limitation entries 250-5 and 250-6, job requests from virtual function VF2 are only allowed to be processed by an enumerated rendering engine ENGINE_1 (e.g., rendering engine 196 of FIG. 1). Limitation entry 250-5 indicates that decoding job requests from virtual function VF2 are not subject to any resolution limitations, while limitation entry 250-6 indicates that encoding job requests from virtual function VF2 are limited to a maximum of 1080p resolution. With respect to the job requests from virtual function VF3, limitation entry 250-7 indicates that decoding job requests from virtual function VF2 are to be processed only by rendering engine ENGINE_0 but are not subject to any resolution limitations, while limitation entry 250-8 indicates that encoding job requests from that virtual function VF2 are limited to a maximum of 1080p resolution.

Figure 3:
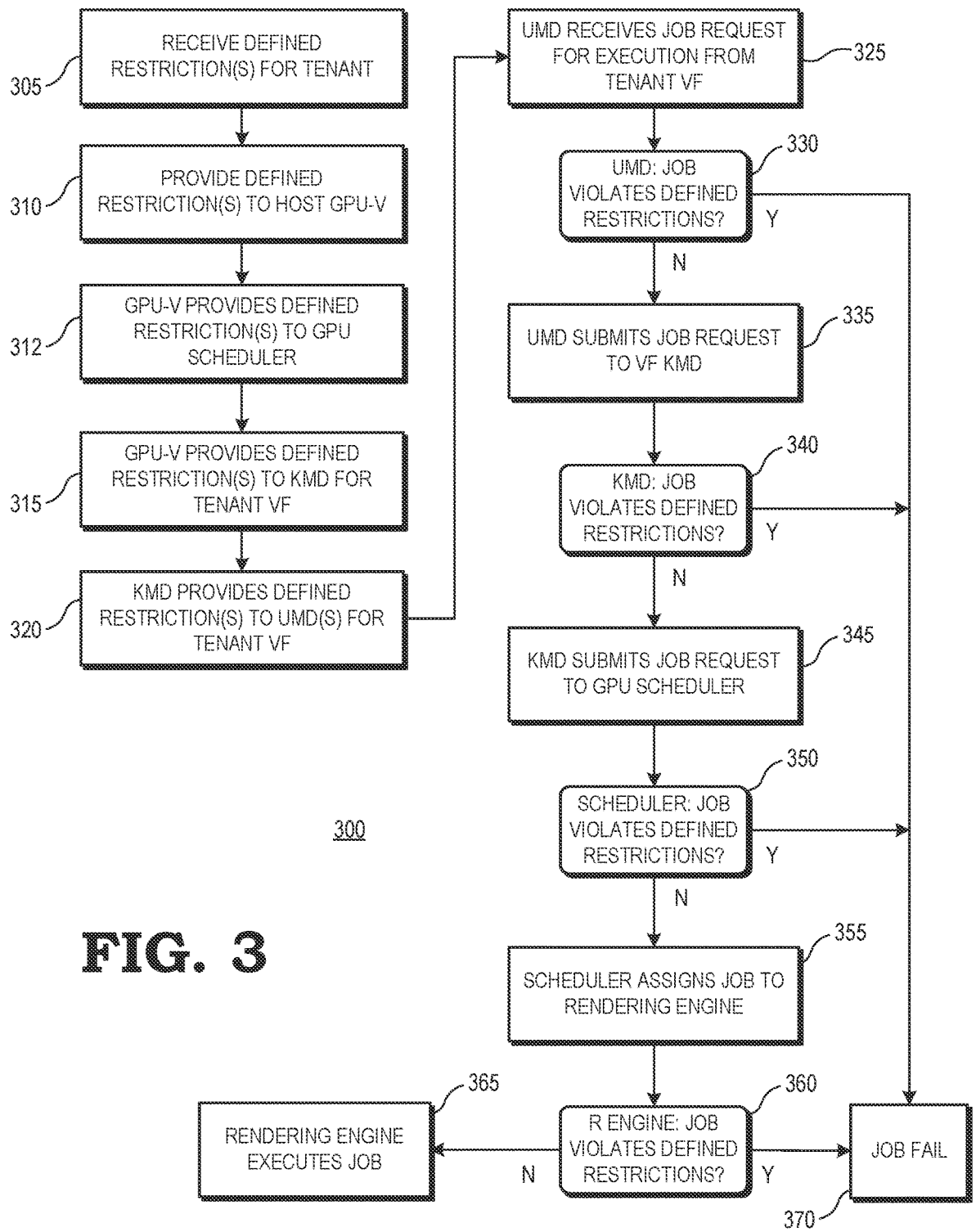
FIG. 3 is a flow diagram illustrating an example of an operational routine for performance by a multitenant computing system in accordance with some embodiments.

FIG. 3 is a flow diagram illustrating an example of an operational routine (routine) 300 for performance by a multitenant computing system (such as computing system 100 of FIG. 1 or server computing system 400 of FIG. 4, described below). In particular, in some embodiments the operational routine is substantially performed via instructions (e.g., as at least some of instructions 424 of FIG. 4) executed by one or more hardware processors (e.g., hardware processor 402 of FIG. 4) for handling one or more job requests from a virtual function.

The routine 300 begins at block 305, in which one or more defined restrictions associated with a tenant (e.g., defined restrictions 112 of FIG. 1 or the set of defined restrictions 200 of FIG. 2) are received by the one or more hardware processors. In certain embodiments, the defined restrictions are received in response to one or more configuration actions performed via various interfaces. For example, the defined restrictions may be configured by an administrator using a command-line interface, graphical user interface (GUI), configuration file, one or more hardware registers, or other facility.

In various embodiments, a static configuration of defined restrictions is utilized as part of initializing the GPU-V driver (e.g., at boot time), or a dynamic configuration is utilized during operation of the system, such as to reconfigure defined restrictions associated with an existing VF or to populate defined restrictions for association with a newly instantiated VF that is associated with a tenant. In either case, responsive to a new configuration for the defined restrictions being received for a particular VF, the scheduler (e.g., scheduler 192 of FIG. 1) communicates some or all of such defined restrictions to one or more rendering engines as well (e.g., rendering engines 194, 196, 198 of FIG. 1), such as by providing an indication of the defined restrictions to firmware running on the rendering engine, which in certain embodiments stores information regarding the defined restrictions in VF context memory for future use in processing job requests. Thus, in certain embodiments the rendering engine firmware provides enforcement of the defined restrictions by, e.g., determining whether a job submission to the rendering engine for execution violates any of the defined restrictions about which information has been stored. In some such embodiments, the rendering engine firmware communicates the violation to the scheduler, which in turn informs the GPU-V driver (e.g., GPU-V driver 113 via KMD 114 of FIG. 1). If a job submission violates defined restrictions relevant to a particular rendering engine, the rendering engine's firmware avoids execution of the violative job submission (by, for example, falsely reporting to the relevant VF KMD that the rendering engine has completed execution of the job submission) in order to avoid impacting applications whose job submissions do not violate any defined restrictions.

The routine proceeds to block 310.

At block 310, the defined restrictions are provided by the one or more hardware processors to a host-side GPU-V driver (such as GPU-V driver 113 of FIG. 1). The routine proceeds to block 312.

At block 312, the GPU-V driver provides the defined restrictions to a scheduler of the GPU (e.g., scheduler 192 of GPU 190 in FIG. 1). The routine proceeds to block 315.

At block 315, the GPU-V driver provides the defined restrictions to a kernel-mode driver (such as KMD 144 of FIG. 1) of a VF (e.g., VF 140 of FIG. 1) that is associated with the tenant to whom the defined restrictions apply. In some scenarios and embodiments, the providing of the defined restrictions to the associated VF is performed as part of initializing one or more KMDs by the GPU-V driver. The routine proceeds to block 320.

At block 320, the KMD provides the tenant-associated defined restrictions to one or more user-mode drivers (e.g., UMDs 145 of FIG. 1). In certain embodiments, the provision of such defined restrictions is responsive to one or more requests from the affected UMDs. The routine proceeds to block 325.

At block 325, one of the user-mode drivers (such as one of UMDs 145 of FIG. 1) receives a job request for execution, such as from an application (e.g., an application 146 of FIG. 1) executing on behalf of the tenant associated with the defined restrictions that were provided to the user-mode driver in block 320. The routine proceeds to block 330.

At block 330, the UMD that received the job request validates the job request to determine whether it violates any of the defined restrictions associated with the tenant. If the job request does not violate any of the defined restrictions, the routine proceeds to block 335.

At block 335, the UMD submits the validated job request to the kernel-mode driver. The routine proceeds to block 340.

At block 340, the KMD that received the job request from the UMD in block 335 validates the job request in accordance with the defined restrictions it received from the GPU-V driver in block 315 to determine whether the job request violates any of those defined restrictions. If the job request does not violate any of the defined restrictions, the routine proceeds to block 345.

At block 345, the KMD submits the now-twice-validated job request to the GPU scheduler associated with the job request's target rendering engine for execution by the GPU. The routine proceeds to block 350.

At block 350, the GPU scheduler that received the job request from the KMD in block 345 (e.g., scheduler 192 of FIG. 1) validates the job requests in accordance with the defined restrictions applicable to the tenant for whom the requesting VF is associated. If the job request does not violate any of those defined restrictions, the routine proceeds to block 355.

At block 355, the GPU scheduler assigns the job request for execution by a rendering engine of the GPU (e.g., rendering engines 194, 196, 198 of FIG. 1). The routine proceeds to block 360.

At block 360, the assigned rendering engine validates the job request in accordance with the defined restrictions applicable to the assigned job. If the job request does not violate any of those defined restrictions, the routine proceeds to block 365, in which the rendering engine executes the requested job.

If the job request fails validation at any of blocks 330, 340, 350, or 360, the routine proceeds to block 370, at which the job request fails. In various embodiments, the job failure is conveyed to the VF (as well as one or more of the relevant UMD and executing application), such as by throwing an exception, reporting that the job request is complete without actually forwarding the job request for execution, or other error handling.

It will be appreciated that in various scenarios and embodiments, portions of the routine 300 as described above may be omitted, such as if a malicious tenant attempts to utilize an open-source or otherwise modified driver to bypass one or more of the validations of a job request described with respect to block 330 and/or block 340. Moreover, in various embodiments, validation of the job request occurs in response to various criteria. For example, in at least one embodiment every job request received by a UMD is validated by that UMD prior to forwarding the job requests to the VF-associated KMD; in other embodiments, a job request may only be validated by that UMD based on one or more performance thresholds, such as a utilization threshold associated with one or more resources shared by multiple tenants of the computing system executing the routine 300, or a quality of service level associated with one or more additional tenants of the multitenant computing system. Similarly, in various embodiments such criteria may be utilized as thresholds or triggers to determine whether validation by the KMD, GPU scheduler, or rendering engine firmware is performed.

Figure 4:
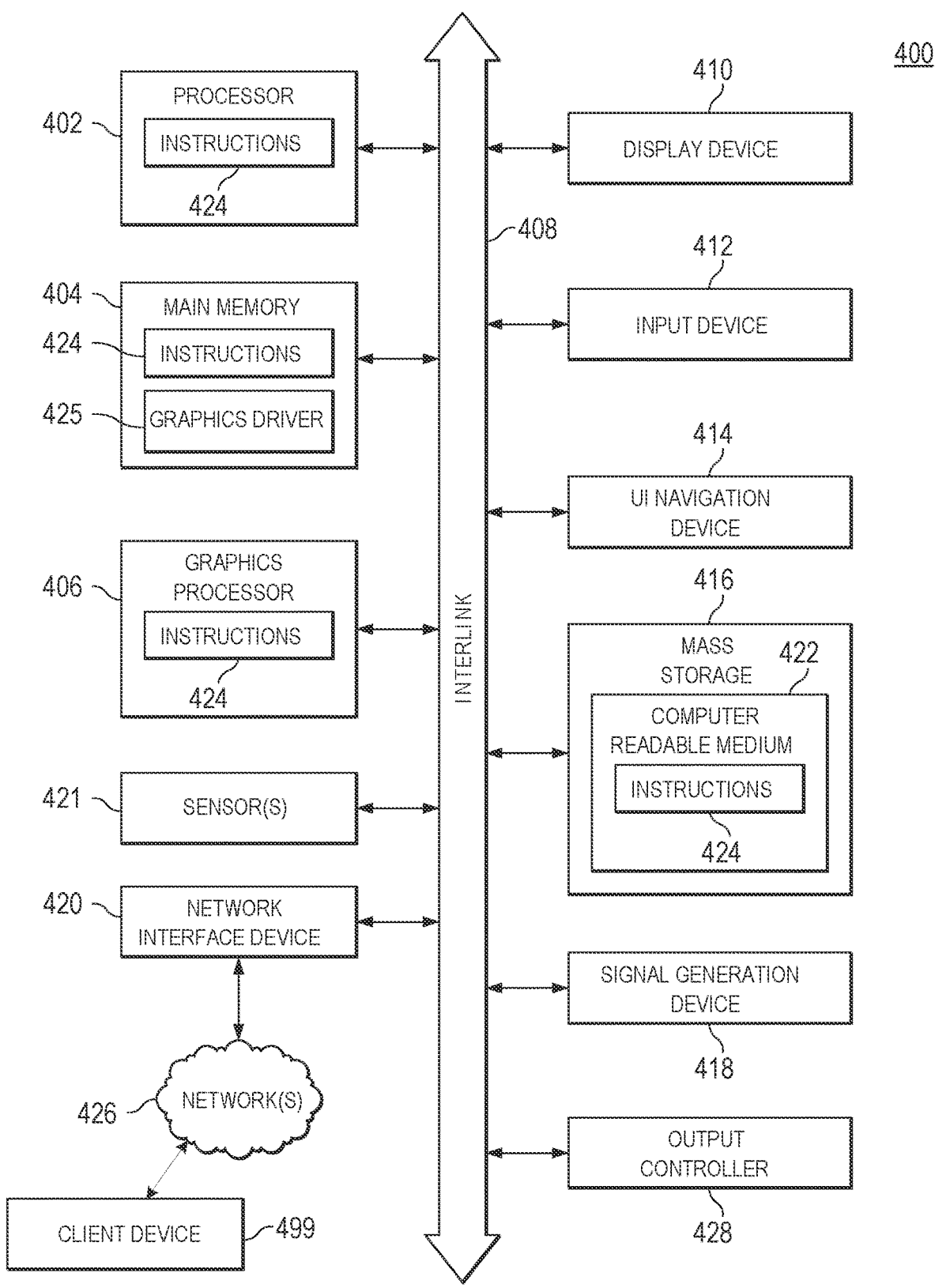
FIG. 4 is a component-level block diagram illustrating an example of a server computing system suitable for implementing one or more embodiments.

FIG. 4 is a component-level block diagram illustrating an example of a server computing system 400 suitable for implementing one or more embodiments. In alternative embodiments, the server computing system 400 may operate as a standalone device or may be connected (e.g., networked) to other systems. In various embodiments, one or more components of the server computing system 400 each comprise a collection of circuitry that, when in combined operation, perform various operations of the server computing system 400 as described herein. In some embodiments, one or more components of the server computing system 400 are incorporated as or within one or more server computing systems to provide, as one non-limiting example, graphics rendering for display to one or more users via one or more remote client computing devices. It will be appreciated that such an associated client computing device may include some components of the server computing system 400, but not necessarily all of them. In a networked deployment, the server computing system 400 operates in the capacity of a server machine, a client machine, or both in server-client network environments. In at least one example, the server computing system 400 acts as a peer system in peer-to-peer (P2P) (or other distributed) network environment. The server computing system 400 therefore operates in certain embodiments as a server computer, a personal computer (PC), a tablet PC, a set-top box (STB), a mobile computing device, a web appliance, a network router, switch or bridge, or any system capable of executing instructions (sequential or otherwise) that specify actions to be taken by that system. Further, while only a single system is illustrated, the term "system" shall also be taken to include any collection of systems that individually or jointly execute a set (or multiple sets) of instructions to perform any one or more of the methodologies discussed herein, such as cloud computing, software as a service (SaaS), other computer cluster configurations.

Examples described herein may include, or may operate by, logic or a number of components or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The server computing system 400 includes one or more hardware processors 402 (e.g., a central processing unit (CPU), a hardware processor core, or any combination thereof), a main memory 404, and a graphics processing unit (GPU) 406 or other parallel processor, some or all of which communicate with each other via an interlink (e.g., bus) 408. In the depicted embodiment, a graphics driver 425 (which is operationally analogous to GPU-V driver 113 of FIG. 1) is executing within the main memory 404, such as to interface with the GPU 406 to implement performance of various operations described herein.

The server computing system 400 further includes a display unit 410 (such as a display monitor or other display device), an input device 412 (e.g., a keyboard or other physical or touch-based actuators), and a user interface (UI) navigation device 414 (e.g., a mouse or other pointing device, such as a touch-based interface). In one example, the display unit 410, input device 412, and UI navigation device 414 includes a touch screen display. The server computing system 400 additionally includes a storage device (e.g., drive unit) 416, a signal generation device 418 (e.g., a speaker), a network interface device 420, and one or more sensors 421, such as a global positioning system (GPS) sensor, compass, accelerometer, or other sensor. The server computing system 400 includes an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 includes a computer-readable medium 422 on which is stored one or more sets of data structures or instructions 424 (e.g., software) embodying or utilized by any one or more of the techniques or functions described herein. The instructions 424 also reside, completely or at least partially, within the main memory 404, within GPU 406, or within the hardware processor 402 during execution thereof by the server computing system 400. In an example, one or any combination of the hardware processor 402, the main memory 404, the GPU 406, or the storage device 416 constitutes computer-readable media.

While the computer-readable medium 422 is illustrated as a single medium, the term "computer-readable medium" includes a single medium or multiple media (e.g., a centralized or distributed database, and/or associated caches and servers) configured to store the one or more instructions 424. Moreover, in certain embodiments and scenarios, the instructions 424 includes data, such as information regarding one or more defined restrictions associated with the relevant tenant.

The term "computer-readable medium" includes any medium that is capable of storing, encoding, or carrying instructions for execution by the server computing system 400 and that cause the server computing system 400 to perform any one or more of the techniques of the present disclosure, or that is capable of storing, encoding or carrying data structures used by or associated with such instructions. Non-limiting computer-readable medium examples include solid-state memories, and optical and magnetic media. In an example, a massed computer-readable medium includes a computer-readable medium with a plurality of particles having invariant (e.g., rest) mass. Accordingly, massed computer-readable media are not transitory propagating signals. Specific examples of massed computer-readable media include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 are transmitted or received over one or more communications networks 426 (which are at least substantially similar to communication network(s) 101 of FIG. 1) to using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 includes one or more physical jacks (e.g., Ethernet, coaxial, or phone jacks) or one or more antennas to connect to the communications network(s) 426 and, thereby, one or more other devices such as client device 499. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the server computing system 400, and includes digital or analog communications signals or other intangible medium to facilitate communication of such software.

In some embodiments, the apparatus and techniques described above are implemented in a system including one or more integrated circuit (IC) devices (also referred to as integrated circuit packages or microchips). Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
    receiving, by a scheduling circuit of a graphics processing unit (GPU) and from a virtual function (VF) associated with a tenant in a multitenant computing system, a job request for execution by the GPU;
    validating, by a user-mode driver (UMD) associated with the tenant, the job request in accordance with one or more defined restrictions associated with the tenant; and
    responsive to successfully validating the job request in accordance with the one or more defined restrictions, forwarding the validated job request to a kernel-mode driver (KMD) associated with the tenant to provide the validated job request to one or more rendering engines of the GPU for execution.

2. The method of claim 1, wherein validating the job request in accordance with the one or more defined restrictions is based at least in part on one or more performance thresholds of the multitenant computing system.

3. The method of claim 2, wherein the tenant is one tenant of multiple tenants utilizing one or more resources of the multitenant computing system, and wherein at least one performance threshold of the one or more performance thresholds is a utilization threshold for the one or more resources.

4. The method of claim 2, wherein at least one performance threshold of the one or more performance thresholds is a quality of service level associated with one or more additional tenants of the multitenant computing system.

5. The method of claim 1, wherein the GPU comprises multiple rendering engines, and wherein at least one restriction of the one or more defined restrictions indicates that jobs associated with the tenant are restricted to be executed by a subset of the multiple rendering engines.

6. The method of claim 1, wherein at least one restriction of the one or more defined restrictions indicates a maximum value or a minimum value for one or more parameters for jobs associated with the tenant.

7. The method of claim 1, wherein at least one restriction of the one or more defined restrictions indicates a restriction based at least in part on a job type associated with the job request.

8. A computing system, comprising:
    a graphics processing unit (GPU); and
    a user-mode driver (UMD) associated with an application executing on behalf of a tenant, the UMD configured to validate a job request in accordance with one or more defined restrictions associated with the tenant;
    a scheduling circuit to:
        receive, from a virtual function (VF) associated with a tenant, the job request for execution by the GPU; and
        responsive to successful validation of the job request in accordance with the one or more defined restrictions, provide the job request via one or more rendering engines of the GPU for execution.

9. The computing system of claim 8, wherein to provide the job request via one or more rendering engines of the GPU for execution comprises forwarding the validated job request to a kernel-mode driver (KMD) associated with the tenant.

10. The computing system of claim 8, wherein to validate the job request in accordance with the one or more defined restrictions includes to validate the job request based at least in part on one or more performance thresholds of the computing system.

11. The computing system of claim 10, wherein the tenant is one tenant of multiple tenants utilizing one or more resources of the computing system, and wherein at least one performance threshold of the one or more performance thresholds is a utilization threshold for the one or more resources.

12. The computing system of claim 10, wherein at least one performance threshold of the one or more performance thresholds is a quality of service level associated with one or more additional tenants of the computing system.

13. The computing system of claim 8, further comprising a virtualization-enabled graphics processing unit (GPU-V) driver communicatively coupled to the GPU.

14. The computing system of claim 8, wherein the GPU includes multiple rendering engines, and wherein at least one restriction of the one or more defined restrictions indicates that jobs associated with the tenant are to be assigned to a subset of the multiple rendering engines.

15. The computing system of claim 8, wherein at least one restriction of the one or more defined restrictions indicates one or more of a group that consists of:

a maximum value for one or more parameters of jobs associated with the tenant; a minimum value for one or more parameters of jobs associated with the tenant; or
a restriction based at least in part on a job type associated with the job request.

16. A method comprising:
validating, by a user-mode driver (UMD) associated with an application executing on behalf of a tenant and in accordance with one or more defined restrictions associated with the tenant, a job request for execution in a multitenant computing system;
forwarding the validated job request from the UMD to a kernel-mode driver (KMD) for execution; and
responsive to the validated job request providing the validated job request from the KMD to a virtualization-enabled driver for execution by a processing unit associated with the virtualization-enabled driver.

* * * * *